(12) United States Patent
Hu et al.

(10) Patent No.: US 12,355,376 B2
(45) Date of Patent: Jul. 8, 2025

(54) ELECTRIC MOTOR CONTROL METHOD, ELECTRIC MOTOR, AND COMPUTER-READABLE STORAGE MEDIUM

(71) Applicants: FOSHAN WELLING WASHER MOTOR MANUFACTURING CO., LTD., Guangdong (CN); WELLING (WUHU) MOTOR MANUFACTURING CO., LTD., Anhui (CN)

(72) Inventors: Xiaolin Hu, Guangdong (CN); Yanyu Wei, Guangdong (CN); Wenjing Ke, Guangdong (CN)

(73) Assignees: FOSHAN WELLING WASHER MOTOR MANUFACTURING CO., LTD., Guangdong (CN); WELLING (WUHU) MOTOR MANUFACTURING CO., LTD., Anhui (CN)

( * ) Notice: Subject to any disclaimer, the term of this patent is extended or adjusted under 35 U.S.C. 154(b) by 152 days.

(21) Appl. No.: 18/368,306

(22) Filed: Sep. 14, 2023

(65) Prior Publication Data

US 2024/0007038 A1    Jan. 4, 2024

Related U.S. Application Data

(63) Continuation of application No. PCT/CN2021/121804, filed on Sep. 29, 2021.

(30) Foreign Application Priority Data

Apr. 16, 2021 (CN) .......................... 202110409950.X (51) Int. Cl.
| | | |
|---|---|---|
| H02P 21/22 | (2016.01) | |
| H02P 21/18 | (2016.01) | |
| H02P 27/12 | (2006.01) | |

(52) U.S. Cl.
CPC .............. *H02P 21/22* (2016.02); *H02P 21/18* (2016.02); *H02P 27/12* (2013.01)

(58) Field of Classification Search
CPC .......... H02P 21/22; H02P 21/18; H02P 27/12; H02P 2209/09

(Continued)

(56) References Cited

U.S. PATENT DOCUMENTS 9,819,299 B2 * 11/2017 Ajima ................... B62D 5/046
10,320,323 B1    6/2019 Wu (Continued)

FOREIGN PATENT DOCUMENTS

| CN | 109672387 A | 4/2019 |
|---|---|---|
| CN | 112202381 A | 1/2021 |

(Continued)

OTHER PUBLICATIONS

International Search Report dated Dec. 22, 2021 issued in PCT/CN2021/121804.

(Continued)

*Primary Examiner* — David Luo
(74) *Attorney, Agent, or Firm* — Scully, Scott, Murphy & Presser, P.C.

(57) ABSTRACT

A control method for an electric motor, an electric motor, and a computer-readable storage medium are provided. According to the method, in a current control cycle, a first theoretical sector corresponding to a voltage vector of an electric motor is determined; in the previous control cycle of the current control cycle, a first sector corresponding to the voltage vector is obtained; a target control cycle in multiple historical control cycles which precede the current control cycle is determined, and an interval duration between the target control cycle and the current control cycle is deter- (Continued)

mined; a target sector corresponding to the voltage vector in the current control cycle based on the first theoretical sector, the first sector, and the interval duration is determined; and a corresponding driving signal based on the target sector is generated, and the electric motor is driven to operate based on the driving signal.

16 Claims, 6 Drawing Sheets

(58) Field of Classification Search
USPC .............................. 318/400.02, 400.01, 700
See application file for complete search history.

(56) References Cited

U.S. PATENT DOCUMENTS

| | | |
|---|---|---|
| 2005/0206341 A1 | 9/2005 | Yin Ho |
| 2019/0319560 A1 | 10/2019 | Shi et al. |

FOREIGN PATENT DOCUMENTS

| | | |
|---|---|---|
| CN | 112260604 A | 1/2021 |
| CN | 112968654 A | 6/2021 |

OTHER PUBLICATIONS

CN First Office Action dated Jan. 28, 2022 issued in CN 202110409950.X.
CN First Search dated Jan. 23, 2022 issued in CN 202110409950.X.
CN Supplementary Search dated Mar. 11, 2022 issued in Cn 202110409950.X.
Du, Fan et al. "Two Methods for Phase Current Reconstruction Using DC-link Current Sensor", Micromotors (Dec. 2013), vol. 46, No. 12, pp. 55-59.

* cited by examiner

ELECTRIC MOTOR CONTROL METHOD, ELECTRIC MOTOR, AND COMPUTER-READABLE STORAGE MEDIUM

CROSS-REFERENCE TO RELATED APPLICATIONS

The present application is a continuation application of International Application No. PCT/CN2021/121804 filed on Sep. 29, 2021, which claims priority to Chinese Patent Application No. 202110409950.X filed with China National Intellectual Property Administration on Apr. 16, 2021 and entitled "A CONTROL METHOD FOR AN ELECTRIC MOTOR, ELECTRIC MOTOR, AND COMPUTER-READABLE STORAGE MEDIUM", the entire contents of each of which are incorporated herein by reference for all purposes. No new matter has been introduced.

FIELD

The present disclosure relates to the field of electric motors, and particularly relates to a control method for an electric motor, an electric motor, and a computer-readable storage medium.

BACKGROUND

In related art, for household appliances driven by an electric motor (such as, an air conditioner, a laundry machine or a range hood), the electric motor adopted by the household appliances generally is driven and controlled by a vector control variable frequency technology. In the vector control variable frequency technology, the phase current sampling of the electric motor is critical, and in order to decrease the additional costs brought by a sampling resistance and lower the inconsistency brought by different sampling resistances, a single-resistance current sampling has been applied more and more.

For a single-resistance current sampling electric motor, a traditional voltage vector sector switching algorithm may cause the problem of current distortion, which renders the increasing of current harmonics and finally renders the increasing of the noise of the electric motor. Thus, the user experience of the household appliances adopting the electric motor is not satisfactory.

SUMMARY

The present disclosure aims to solve at least one of the problems in the prior art or related art.

Thus, the first aspect of the present disclosure proposes a control method for an electric motor.

The second aspect of the present disclosure proposes an electric motor.

The third aspect of the present disclosure proposes a computer-readable storage medium.

In view of this, the first aspect of the present disclosure proposes an control method for an electric motor, including: determining, in the current control cycle, a first theoretical sector corresponding to the voltage vector of an electric motor; obtaining, in the previous control cycle of the current control cycle, a first sector corresponding to the voltage vector; determining a target control cycle in a plurality of historical control cycles which precede the current control cycle, and determining an interval duration between the target control cycle and the current control cycle; determining a target sector corresponding to the voltage vector in the current control cycle based on the first theoretical sector, the first sector and the interval duration; and generating a corresponding driving signal based on the target sector, and by the driving signal, driving the electric motor to operate.

In the embodiment, the control process of the electric motor comprises a plurality of control cycles, when entering each control cycle, the control system of the electric motor determines, in the current control cycle, the first theoretical section of the voltage vector of the electric motor, and in an embodiment, the first theoretical section can be calculated through an SVPWM (Space Vector Pulse Width Modulation) algorithm.

Meanwhile, the control system of the electric motor acquires, in the previous control cycle, the actual sector of the voltage vector, i.e., the first sector. The control cycle mentioned in the phase of "the previous control cycle of the current control cycle" indicates a historical control cycle adjacent to the current control cycle, that is, the control process of the electric motor is to transit from "the previous control cycle" to "the current control cycle".

Furthermore, one target control cycle is determined in the plurality of historical control cycles, and the plurality of historical control cycles indicate an aggregation of all the control cycles that have passed after the electric motor starts while before it enters the current control cycle. The target control cycle is a control cycle in the plurality of historical control cycles which meets a preset condition, and an interval duration between the target control cycle and the current control cycle is acquired.

The target sector corresponding to the voltage vector of the current control cycle is determined based on the first theoretical sector of the current control cycle, the first sector of the previous control cycle, and the interval duration between the target control cycle and the current control cycle, i.e., whether the current cycle needs to switch the sector is determined, and which sector should be switched to is determined if the sector needs to be switched. Substantially the target sector is finally configured to generate the sector used by a control signal for driving the current electric motor to operate.

In the case that the sector needs to be switched based on the determination of whether the current control cycle needs to switch the sector, after the sector is switched to the target sector, the control system of the electric motor generates a corresponding driving signal based on the target sector and drives the electric motor to operate by the driving signal.

The first sector is the action sector of the voltage vector, the first theoretical sector is a sector on which the voltage vector "theoretically" may act acquired based on an algorithm; when the target sector is the same as the first theoretical sector, the first theoretical sector becomes the action sector of the voltage vector, and in an embodiment, it refers to the sector finally configured to adjust the switching time of an inverter power device. The theoretical sector and the action sector of the voltage vector can be the same or different from each other; when the theoretical vector (the located sector) of the voltage vector is configured to adjust the switching time of the inverter power device, the theoretical sector and the action sector of the voltage vector are the same; when the theoretical sector (the located sector) of the voltage vector is not configured to adjust the switching time of the inverter power device, the theoretical sector and the action sector of the voltage vector are different from each other.

The embodiment of the present disclosure determines the target sector of the current control cycle in combination with and by reference to the theoretical sector of the current control cycle, the actual sector of the previous control cycle and the interval duration between a historical control cycle and the current control cycle, and thus generates the driving signal of the electric motor based on the target sector, and this can suppress the phase current distortion of single resistance sampling during the switching of the sectors of the voltage vector, reduce current harmonics, and effectively lower the operation noise of the electric motor, and to improve user experience.

In addition, the control method for an electric motor in the above embodiment according to the present disclosure can further comprise the following additional features:

in the above embodiment, determining, in the current control cycle, a first theoretical sector corresponding to the voltage vector of an electric motor comprises: calculating the first theoretical sector based on a voltage instruction in the current control cycle using space vector pulse width modulation.

In the embodiment, the first theoretical sector indicates the theoretical sector corresponding to the voltage vector in the current control cycle calculated through the space vector pulse width modulation. In an embodiment, the theoretical sector where the voltage vector in the current control cycle is located can be calculated through the SVPWM (Space Vector Pulse Width Modulation) algorithm based on the voltage instruction corresponding to the current control cycle. The first theoretical sector is in an embodiment the theoretical value of the action sector of the voltage vector, the theoretical sector and the actual action sector of the voltage vector can be the same or different from each other; when the theoretical sector (the located sector) of the voltage vector is configured to adjust the switching time of the inverter power device, the theoretical sector and the action sector of the voltage vector are the same; when the theoretical sector (the located sector) of the voltage vector is not configured to adjust the switching time of the inverter power device, the theoretical sector and the action sector of the voltage vector are different from each other.

In any of the above embodiments, the control method for an electric motor further comprises: starting timing at the beginning of the first control cycle; determining, after entering each control cycle, whether a second theoretical sector corresponding to the voltage vector is the same as a second sector corresponding to the voltage vector in the previous control cycle; obtaining a timing duration and restarting timing in the case that the second theoretical sector is different from the second sector and the duration corresponding to the second sector is greater than or equal to a duration threshold.

In the embodiment, when the control cycle starts, timing starts synchronously. Then, whenever the current control cycle ends and meanwhile enters the next new control cycle, whether the second theoretical sector corresponding to the entered "new control cycle" and the second sector on which the voltage vector actually acts in the just left "previous control cycle" are the same sector is determined, i.e., whether the sector on which the voltage vector acts changes after entering a new control cycle is determined.

The second sector is the action sector of the voltage vector in "the previous control cycle", while the second theoretical sector is the sector on which the voltage vector may "theoretically" acts in the current control cycle acquired by an algorithm after leaving the previous control cycle.

If the second theoretical sector is the same as the second sector, that is, after entering the new control cycle, the sector on which the voltage vector acts does not need to change, and the timing continues.

If the second theoretical sector is different from the second sector, but the duration corresponding to the second sector is less than the duration threshold, that is, the time when the voltage vector acts on the second sector is relatively short, it is further determined that the sector does not need to change, and the timing continues.

Only when the second theoretical sector is different from the second sector, and meanwhile the duration corresponding to the second sector is greater than or equal to the duration threshold, i.e., after the voltage vector acts on the second sector for a sufficiently long time, and the theoretical sector of the next control cycle is inconsistent with the second sector, it is determined that the sector needs to change, and at the moment, after the timing duration is recorded, the timing duration is reset and timing restarts.

Through comparing whether the time duration when the voltage vector acts on a sector is greater than a set duration threshold in some control cycles, whether the sector on which the voltage vector acts in the current control cycle needs to change based on the theoretical sector is determined, and this can suppress the phase current distortion of single resistance sampling during the switching of the sectors of voltage vector, reduce current harmonics, and effectively reduce the operation noise of the electric motor, and to improve user experience.

In any of the above embodiments, the target control cycle satisfies the following conditions: the third sectors corresponding to all the historical control cycles between the target control cycle and the current control cycle are all the first sector.

In the embodiment, the target control cycle is the "previous" cycle with sector change, that is, in the case that the sector on which the voltage vector acts is the first sector in the previous control cycle of the current control cycle, the target control cycle is a sector that the voltage vector changes from the "third sector" to the "first sector", that is, the earliest "historical sector" after a time order arrangement in a historical control cycle in which a number of voltage vectors act on the first sector.

Therefore, the target control cycle satisfies the third sector corresponding to the target control cycle, and the third sectors corresponding to all the control cycles between the target control cycle and the current control cycle are all the first sector, that is, from the target control cycle, the sector on which the voltage vector acts is not changed, and the target control cycle is a historical control cycle closest to the current control cycle in which the sector on which the voltage vector acts changes.

In any of the above embodiments, determining an interval duration between the target control cycle and the current control cycle comprises: determining the interval duration based on the timing duration.

In the embodiment, whenever entering a next new control cycle, whether the theoretical sector corresponding to the entered "new control cycle" and the sector on which the voltage vector actually acts in the just left "previous control cycle" are the same sector will be determined, if they are the same sector, timing continues; only when the theoretical sector of the current cycle is different from the sector on which the voltage vector actually acts in the previous control cycle, and the duration in which the sector is actually acted is greater than the duration threshold, the timing duration is reset and the timing restarts.

Therefore, since the target control cycle is a historical control cycle closest to the current control cycle in which the sector on which the voltage vector acts is changed, before entering the current control cycle, the timing is not reset, the interval duration between the target control cycle and the current control cycle can be determined based on the current timing duration.

In any of the above embodiments, determining a target sector corresponding to the voltage vector in the current control cycle based on the first theoretical sector, the first sector and the interval duration comprises: determining that the target sector is the first sector in the case that the first theoretical sector is the same as the first sector, or in the case that the first theoretical sector is different from the first sector and the interval duration is less than the duration threshold; and determining that the target sector is the first theoretical sector in the case that the first theoretical sector is different from the first sector and the interval duration is greater than or equal to the duration threshold.

In the embodiment, if the first theoretical sector is the same as the first sector, i.e., the theoretical sector corresponding to the voltage vector in the current control cycle acquired by the SVPWM algorithm is the same as the actual sector on which the voltage vector acts in the previous control cycle, it means that the current control cycle does not need to change the sector, the sector on which the voltage vector acts in the current control cycle is still the first sector, and a corresponding driving signal is generated by the first sector to drive the electric motor to operate.

If the first theoretical sector is different from the first sector, but the interval duration is less than the duration threshold, i.e., it means that an action of changing the sector on which the voltage vector acts will occur again within a relatively short time after the last change of the sector on which the voltage vector acts. Since the sector on which the voltage vector acts should not be changed frequently in an ideal environment, it is determined that the theoretical sector acquired by the SVPWM algorithm this time is wrong, and the sector on which the voltage vector acts in the current control cycle is maintained the first sector, i.e., the sector is not switched.

When the first theoretical sector is different from the first sector and it is satisfied that the interval duration is greater than or equal to the duration threshold, i.e., it has been a relatively long time since the last change of the sector on which the voltage vector acts, and at the moment, the theoretical sector acquired by the SVPWM algorithm, i.e., the first theoretical sector, is used as the target sector on which the voltage vector acts in the current control cycle, and the corresponding driving signal is generated through the target sector to drive the electric motor to operate.

The embodiment of the present disclosure can suppress the phase current distortion of single resistance sampling during the switching of the sectors of the voltage vector, reduce current harmonics, and effectively reduce the operation noise of the electric motor, and to improve user experience.

In any of the above embodiments, the duration threshold is a product of the duration of the second sector and a preset constant, and the preset constant ranges from 0.1 to 1.

In the embodiment, the duration threshold can be calculated based on the duration of the sector on which the changed voltage vector acts whenever the sector on which the voltage vector acts changes in the historical control cycles. In an embodiment, the duration threshold is equal to the product of the duration of the second sector and the preset constant, the value of the preset constant can be a fixed value, and the value range is between 0.1 and 1, i.e., the minimum value of the preset constant is 0.1 and the maximum value is 1.

In some embodiments, the specific value of the preset constant can be adjusted dynamically based on the specific operating states of the electric motor, in an embodiment, the value of the preset constant can be adjusted based on whether the electric motor operates in an accelerating state or in a decelerating state. In an embodiment, when the electric motor conducts an accelerating operation, the preset constant can adopt a relatively small value, when the electric motor conducts a decelerating operation, the preset constant can adopt a relatively large value.

In any of the above embodiments, the duration threshold is determined based on the current rotational speed of the electric motor or the maximum rotational speed of the electric motor, and the duration threshold is negatively correlated with the current rotational speed or the maximum rotational speed.

In the embodiment, when the duration threshold is determined, the corresponding duration threshold can further be determined based on the current rotational speed of the electric motor or the maximum rotational speed of the electric motor within a rotational cycle. The determining method can be set based on experiences, and it can be determined by establishing a preset table and then acquired by checking the table, or determined dynamically based on a preset algorithm; and the embodiments of the present disclosure are not limited thereto.

The duration threshold is negatively correlated with the current rotational speed of the electric motor or the maximum rotational speed of the electric motor within a rotational cycle, that is, the larger the current rotational speed (maximum rotational speed) of the electric motor is, the smaller the duration threshold is, that is, the smaller the current rotational speed (maximum rotational speed) of the electric motor is, the larger the duration threshold is.

The second aspect of the present disclosure proposes an electric motor, including: a storage storing a program or instructions; and a processor, configured to execute the program or instructions to implement the control method according to any of the above embodiments; therefore, the electric motor further comprises all the beneficial effects of the control method for an electric motor according to any of the above embodiments, and to avoid repetition, they are not described herein again.

The third aspect of the present disclosure proposes a computer-readable storage medium storing a program or instructions, and the program or instructions, when executed by a processor, implement the control method according to any of the embodiments, and therefore, the computer-readable storage medium further comprises all the beneficial effects of the control method for an electric motor according to any of the above embodiments, and to avoid repetition, they are not described herein again.

BRIEF DESCRIPTION OF THE DRAWINGS

The above and/or additional aspects and advantages of the present disclosure will be obvious and understood easily from the following description of the embodiments in combination with the accompanying drawings. And, FIG. 1 shows the first flow chart of a control method for an electric motor according to an embodiment of the present disclosure.

DETAILED DESCRIPTION

To more clearly understand the above objects, features and advantages of the present disclosure, the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a fully understanding to the present disclosure, but the present disclosure can further be implemented using other embodiments other than these described herein. Therefore, the protection scope of the present disclosure is not limited to the specific embodiments disclosed in the following text.

A control method for an electric motor, an electric motor, and a computer-readable storage medium proposed by some embodiments of the present disclosure are described below with reference to FIG. 1 to FIG. 8.

Figure 1:
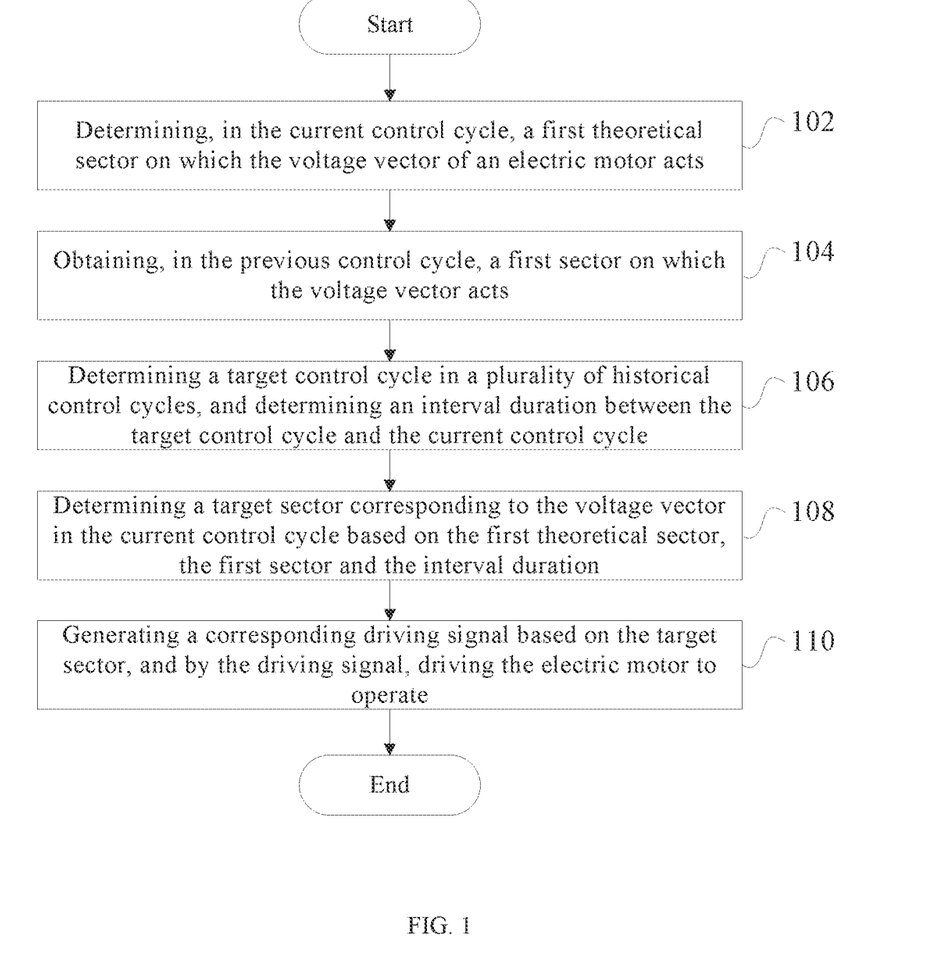

A control method for an electric motor is according to some embodiments of the present disclosure, FIG. 1 shows the first flow chart of a control method for an electric motor according to an embodiment of the present disclosure, as shown in FIG. 1, the control method comprises:

step 102: determining, in the current control cycle, a first theoretical sector on which the voltage vector of an electric motor acts;

step 104: obtaining, in the previous control cycle, a first sector on which the voltage vector acts;

step 106: determining a target control cycle in a plurality of historical control cycles, and determining an interval duration between the target control cycle and the current control cycle;

step 108: determining a target sector corresponding to the voltage vector in the current control cycle based on the first theoretical sector, the first sector and the interval duration; and step 110: generating a corresponding driving signal based on the target sector, and by the driving signal, driving the electric motor to operate.

In the embodiment of the present disclosure, the control process of the electric motor comprises a plurality of control cycles, when entering each control cycle, the control system of the electric motor determines, in the current control cycle, the first theoretical section of the voltage vector of the electric motor, and in an embodiment, the first theoretical section can be calculated through an SVPWM (Space Vector Pulse Width Modulation) algorithm.

Meanwhile, the control system of the electric motor acquires, in the previous control cycle, the actual sector of the voltage vector, i.e., the first sector. The control cycle mentioned in the phase of "the previous control cycle of the current control cycle" indicates a historical control cycle adjacent to the current control cycle, that is, the control process of the electric motor is to transit from "the previous control cycle" to "the current control cycle".

Furthermore, one target control cycle is determined in the plurality of historical control cycles, and the plurality of historical control cycles indicate an aggregation of all the control cycles that have passed after the electric motor starts while before it enters the current control cycle. The target control cycle is a control cycle in the plurality of historical control cycles which meets a preset condition, and an interval duration between the target control cycle and the current control cycle is acquired.

The target sector corresponding to the voltage vector of the current control cycle is determined based on the first theoretical sector of the current control cycle, the first sector of the previous control cycle, and the interval duration between the target control cycle and the current control cycle, i.e., whether the current cycle needs to switch the sector is determined, and which sector should be switched to is determined if the sector needs to be switched. Substantially the target sector is finally configured to generate the sector used by a control signal for driving the current electric motor to operate.

In the case that the sector needs to be switched based on the determination of whether the current control cycle needs to switch the sector and in the case, after the sector is switched to the target sector, the control system of the electric motor generates a corresponding driving signal based on the target sector and drives the electric motor to operate by the driving signal.

The first sector is the action sector of the voltage vector, the first theoretical sector is a sector on which the voltage vector "theoretically" may act acquired based on an algorithm; when the target sector is the same as the first theoretical sector, the first theoretical sector becomes the action sector of the voltage vector, and in an embodiment, it refers to the sector finally configured to adjust the switching time of an inverter power device. The theoretical sector and the action sector of the voltage vector can be the same or different from each other; when the theoretical vector (the located sector) of the voltage vector is configured to adjust the switching time of the inverter power device, the theoretical sector and the action sector of the voltage vector are the same; when the theoretical sector (the located sector) of the voltage vector is not configured to adjust the switching time of the inverter power device, the theoretical sector and the action sector of the voltage vector are different from each other.

The embodiment of the present disclosure determines the target sector of the current control cycle in combination with and by reference to the theoretical sector of the current control cycle, the actual sector of the previous control cycle and the interval duration between a historical control cycle and the current control cycle, and thus generates the driving signal of the electric motor based on the target sector, and this can suppress the phase current distortion of single resistance sampling during the switching of the sectors of the voltage vector, reduce current harmonics, and effectively lower the operation noise of the electric motor, and to improve user experience.

In some embodiments of the present disclosure, determining, in the current control cycle, a first theoretical sector corresponding to the voltage vector of an electric motor comprises: calculating the first theoretical sector based on a voltage instruction in the current control cycle using a space vector pulse width modulation (SVPWM).

In the embodiment of the present disclosure, the first theoretical sector indicates the theoretical sector corresponding to the voltage vector in the current control cycle calculated through the space vector pulse width modulation. In an embodiment, the theoretical sector where the voltage vector in the current control cycle is located can be calculated through the SVPWM (Space Vector Pulse Width Modulation) algorithm based on the voltage instruction corresponding to the current control cycle. The first theoretical sector is in an embodiment the theoretical value of the action sector of the voltage vector, the theoretical sector and the actual action sector of the voltage vector can be the same or different from each other; when the theoretical sector (the located sector) of the voltage vector is configured to adjust the switching time of the inverter power device, the theoretical sector and the action sector of the voltage vector are the same; when the theoretical sector (the located sector) of the voltage vector is not configured to adjust the switching time of the inverter power device, the theoretical sector and the action sector of the voltage vector are different from each other.

Figure 2:
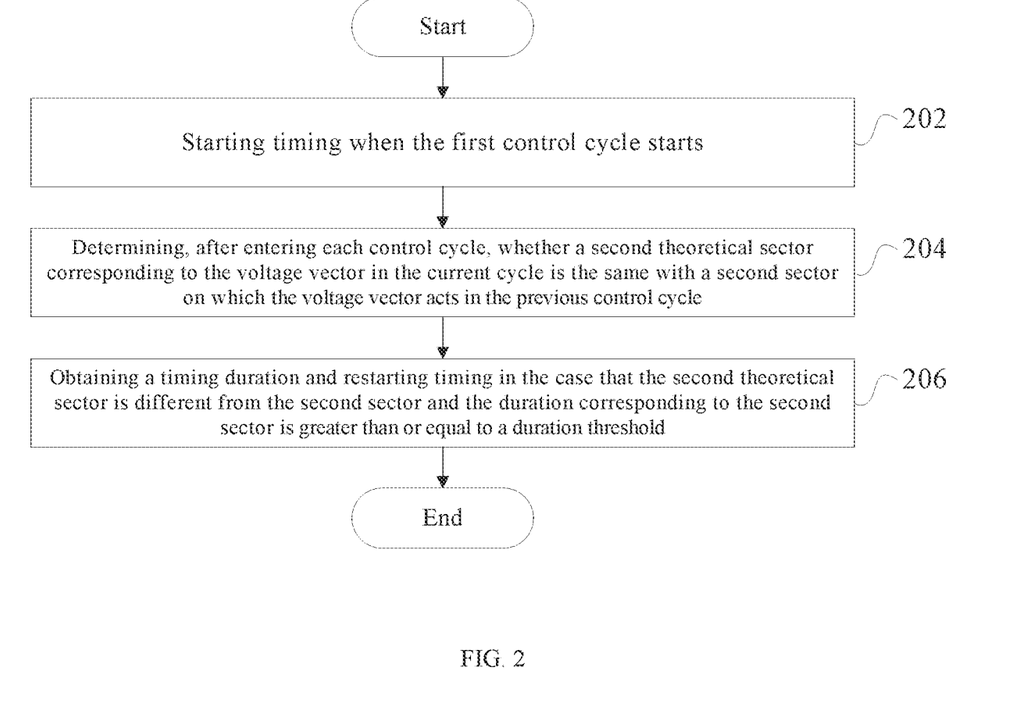
FIG. 2 shows the second flow chart of a control method for an electric motor according to an embodiment of the present disclosure.

In the embodiment of the present disclosure, FIG. 2 shows the second flow chart of an control method for an electric motor according to an embodiment of the present disclosure; as shown in FIG. 2, the control method for an electric motor further comprises:

step 202: starting timing at the beginning of the first control cycle;

step 204: determining, after entering each control cycle, whether a second theoretical sector corresponding to the voltage vector in the current cycle is the same as a second sector on which the voltage vector acts in the previous control cycle; and step 206: obtaining a timing duration and restarting timing in the case that the second theoretical sector is different from the second sector and the duration corresponding to the second sector is greater than or equal to a duration threshold.

In the embodiment of the present disclosure, when the control cycle starts, timing starts synchronously. Then, whenever the current control cycle ends and meanwhile enters the next new control cycle, whether the second theoretical sector corresponding to the entered "new control cycle" and the second sector on which the voltage vector actually acts in the just left "previous control cycle" are the same sector is determined, i.e., whether the sector on which the voltage vector acts changes after entering a new control cycle is determined.

The second sector is the action sector of the voltage vector in "the previous control cycle", while the second theoretical sector is the sector on which the voltage vector may "theoretically" acts in the current control cycle acquired by an algorithm after leaving the previous control cycle.

If the second theoretical sector is the same as the second sector, that is, after entering the new control cycle, the sector on which the voltage vector acts does not need to change, and the timing continues.

If the second theoretical sector is different from the second sector, but the duration corresponding to the second sector is less than the duration threshold, that is, the time when the voltage vector acts on the second sector is relatively short, it is further determined that the sector does not need to change, and the timing continues.

Only when the second theoretical sector is different from the second sector, and meanwhile the duration corresponding to the second sector is greater than or equal to the duration threshold, i.e., after the voltage vector acts on the second sector for a sufficiently long time, and the theoretical sector of the next control cycle is inconsistent with the second sector, it is determined that the sector needs to change, and at the moment, after the timing duration is recorded, the timing duration is reset and timing restarts.

Through comparing whether the time duration when the voltage vector acts on a sector is greater than a set duration threshold in some control cycles, whether the sector on which the voltage vector acts in the current control cycle needs to change based on the theoretical sector is determined, and this can suppress the phase current distortion of single resistance sampling during the switching of the sectors of voltage vector, reduce current harmonics, and effectively reduce the operation noise of the electric motor, and to improve user experience.

In some embodiments of the present disclosure, the target control cycle satisfies the following conditions:
the third sectors corresponding to all the historical control cycles between the target control cycle and the current control cycle are all the first sector.

In the embodiment of the present disclosure, the target control cycle is the "previous" cycle with sector change, that is, in the case that the sector on which the voltage vector acts is the first sector in the previous control cycle of the current control cycle, the target control cycle is a sector that the voltage vector changes from the "third sector" to the "first sector", that is, the earliest "historical sector" after a time order arrangement in a historical control cycle in which a number of voltage vectors act on the first sector.

Therefore, the target control cycle satisfies the third sector corresponding to the target control cycle, and the third sectors corresponding to all the control cycles between the target control cycle and the current control cycle are all the first sector, that is, from the target control cycle, the sector on which the voltage vector acts is not changed, and the target control cycle is a historical control cycle closest to the current control cycle in which the sector on which the voltage vector acts changes.

In some embodiments of the present disclosure, the step of determining an interval duration between the target control cycle and the current control cycle in an embodiment comprises: determining the interval duration based on the timing duration.

In the embodiment of the present disclosure, whenever entering a next new control cycle, whether the theoretical sector corresponding to the entered "new control cycle" and the sector on which the voltage vector actually acts in the just left "previous control cycle" are the same sector is determined, if they are the same sector, timing continues; only when the theoretical sector of the current cycle is different from the sector on which the voltage vector actually acts in the previous control cycle, and the duration in which the sector is actually acted is greater than the duration threshold, the timing duration is reset and the timing restarts.

Therefore, since the target control cycle is a historical control cycle closest to the current control cycle in which the sector on which the voltage vector acts is changed, before entering the current control cycle, the timing is not reset, the interval duration between the target control cycle and the current control cycle can be determined based on the current timing duration.

Figure 3:
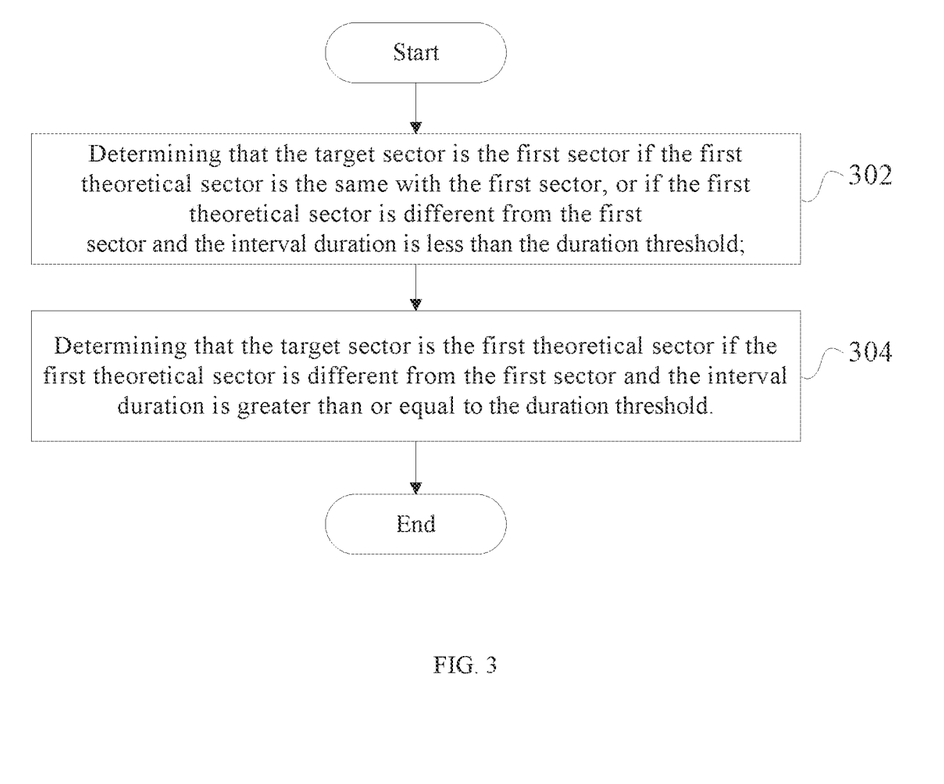
FIG. 3 shows the third flow chart of a control method for an electric motor according to an embodiment of the present disclosure.

In some embodiments of the present disclosure, FIG. 3 shows the third flow chart of a control method for an electric motor based on an embodiment of the present disclosure; as shown in FIG. 3, the step of determining a target sector corresponding to the voltage vector in the current control cycle based on the first theoretical sector, the first sector and the interval duration in an embodiment comprises:

step 302: determining that the target sector is the first sector if the first theoretical sector is the same as the first sector, or if the first theoretical sector is different from the first sector and the interval duration is less than the duration threshold; and step 304: determining that the target sector is the first theoretical sector if the first theoretical sector is different from the first sector and the interval duration is greater than or equal to the duration threshold.

In the embodiment of the present disclosure, if the first theoretical sector is the same as the first sector, i.e., the theoretical sector corresponding to the voltage vector in the current control cycle acquired by the SVPWM algorithm is the same as the actual sector on which the voltage vector acts in the previous control cycle, it means that the current control cycle does not need to change the sector, the sector on which the voltage vector acts in the current control cycle is still the first sector, and a corresponding driving signal is generated by the first sector to drive the electric motor to operate.

If the first theoretical sector is different from the first sector, but the interval duration is less than the duration threshold, i.e., it means that an action of changing the sector on which the voltage vector acts will occur again within a relatively short time after the last change of the sector on which the voltage vector acts. Since the sector on which the voltage vector acts should not be changed frequently in an ideal environment, it is determined that the theoretical sector acquired by the SVPWM algorithm this time is wrong, and the sector on which the voltage vector acts in the current control cycle is maintained the first sector, i.e., the sector is not switched.

When the first theoretical sector is different from the first sector and it is satisfied that the interval duration is greater than or equal to the duration threshold, i.e., it has been a relatively long time since the last change of the sector on which the voltage vector acts, and at the moment, the theoretical sector acquired by the SVPWM algorithm, i.e., the first theoretical sector, is used as the target sector on which the voltage vector acts in the current control cycle, and the corresponding driving signal is generated through the target sector to drive the electric motor to operate.

The embodiment of the present disclosure can suppress the phase current distortion of single resistance sampling during the switching of the sectors of the voltage vector, reduce current harmonics, and effectively reduce the operation noise of the electric motor, and to improve user experience.

In some embodiments of the present disclosure, the duration threshold is a product of the duration of the second sector and a preset constant, and the preset constant ranges from 0.1 to 1.

In the embodiment of the present disclosure, the duration threshold can be calculated based on the duration of the sector on which the changed voltage vector acts whenever the sector on which the voltage vector acts changes in the historical control cycles. In an embodiment, the duration threshold is equal to the product of the duration of the second sector and the preset constant, the value of the preset constant can be a fixed value, and the value range is between 0.1 and 1, i.e., the minimum value of the preset constant is 0.1 and the maximum value is 1.

In some embodiments, the specific value of the preset constant can be adjusted dynamically based on the specific operating states of the electric motor, in an embodiment, the value of the preset constant can be adjusted based on whether the electric motor operates in an accelerating state or in a decelerating state. In an embodiment, when the electric motor conducts an accelerating operation, the preset constant can adopt a relatively small value, when the electric motor conducts a decelerating operation, the preset constant can adopt a relatively large value.

In some embodiments of the present disclosure, the duration threshold is determined based on the current rotational speed of the electric motor or the maximum rotational speed of the electric motor, and the duration threshold is negatively correlated with the current rotational speed or the maximum rotational speed.

In the embodiment of the present disclosure, when the duration threshold is determined, the corresponding duration threshold can further be determined based on the current rotational speed of the electric motor or the maximum rotational speed of the electric motor within a rotational cycle. The determining method can be set based on experiences, and it can be determined by establishing a preset table and then acquired by checking the table, or determined dynamically based on a preset algorithm; and the embodiments of the present disclosure are not limited thereto.

The duration threshold is negatively correlated with the current rotational speed of the electric motor or the maximum rotational speed of the electric motor within a rotational cycle, that is, the larger the current rotational speed (maximum rotational speed) of the electric motor is, the smaller the duration threshold is, that is, the smaller the current rotational speed (maximum rotational speed) of the electric motor is, the larger the duration threshold is.

Figure 4:
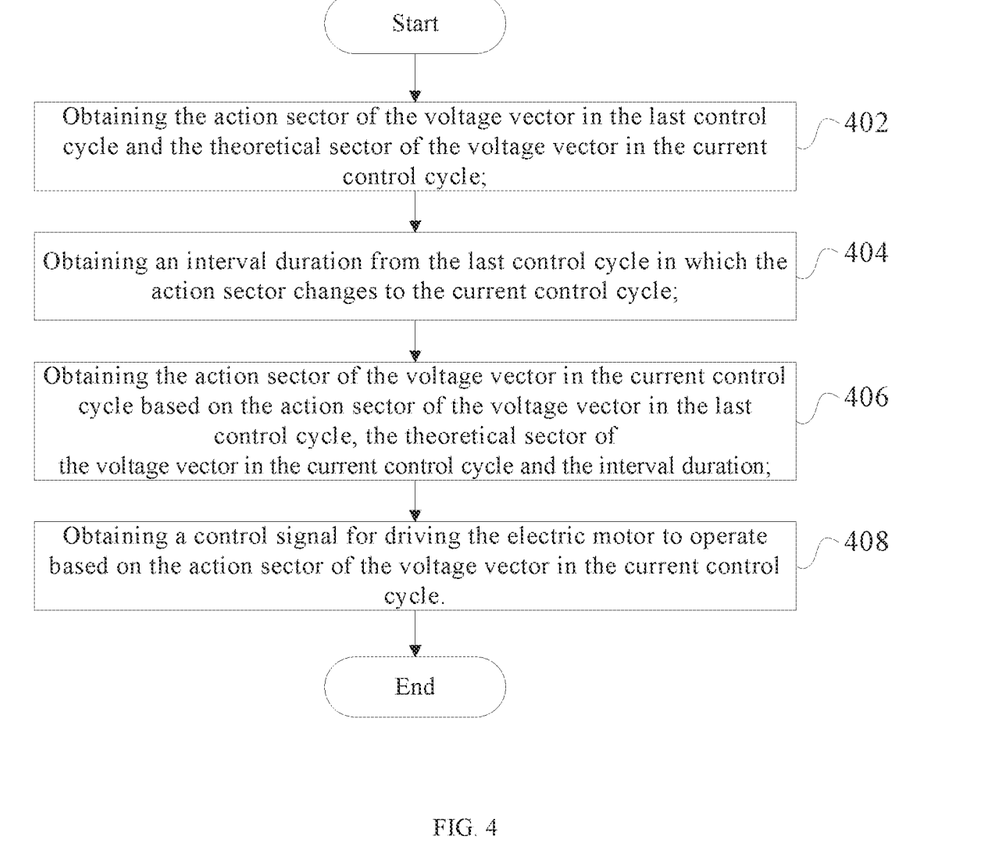
FIG. 4 shows the fourth flow chart of a control method for an electric motor according to an embodiment of the present disclosure.

In a complete embodiment of the present disclosure, FIG. 4 shows the fourth flow chart of a control method for an electric motor according to an embodiment of the present disclosure, as shown in FIG. 4, the control method for an electric motor comprises:

step 402: obtaining the action sector of the voltage vector in the last control cycle and the theoretical sector of the voltage vector in the current control cycle;

in step 402, the theoretical sector of the voltage vector indicates the sector where the voltage vector is located calculated based on an SVPWM (Space Vector Pulse Width Modulation), and the action sector of the voltage vector indicates an action sector finally used for adjusting the switching time of the inverter power device. The theoretical sector and the action vector of the voltage vector can be the same or different from each other; when the theoretical sector (the located sector) of the voltage vector is configured to adjust the switching time of the inverter power device, the theoretical sector and the action sector of the voltage vector are the same; when the theoretical sector (the located sector) of the voltage vector is not configured to adjust the switching time of the inverter power device, the theoretical sector and the action sector of the voltage vector are different from each other.

Step 404: obtaining an interval duration from the last control cycle in which the action sector changes to the current control cycle; and in step 404, firstly, whether the current sector changes is determined based on whether the action sector of the voltage vector in the last control cycle is consistent with the theoretical sector of the voltage vector in the current control cycle. If the current sector does not change, the timing of the interval duration is accumulated; if the current sector changes and the interval duration is less than the time threshold, the timing of the interval duration is accumulated; and if the current sector changes and the interval duration is greater than or equal to the time threshold, the timing of the interval duration is reset.

Step 406: obtaining the action sector of the voltage vector in the current control cycle based on the action sector of the voltage vector in the last control cycle, the theoretical sector of the voltage vector in the current control cycle and the interval duration; and in step 406, firstly, the time threshold of the current control cycle is acquired; whether the current sector changes is determined based on whether the action sector of the voltage vector in the last control cycle is consistent with the theoretical sector of the voltage vector in the current control cycle; if the current sector does not change, the action sector of the voltage vector in the current control cycle remains unchanged; if the current sector changes and the interval duration is less than the time threshold, the action sector of the voltage vector in the current control cycle remains unchanged; and if the current sector changes and the interval duration is greater than or equal to the time threshold, the action sector of the voltage vector in the current control cycle is updated to be the theoretical sector of the voltage vector in the current control cycle.

Step 408: obtaining a control signal for driving the electric motor to operate based on the action sector of the voltage vector in the current control cycle.

Figure 5:
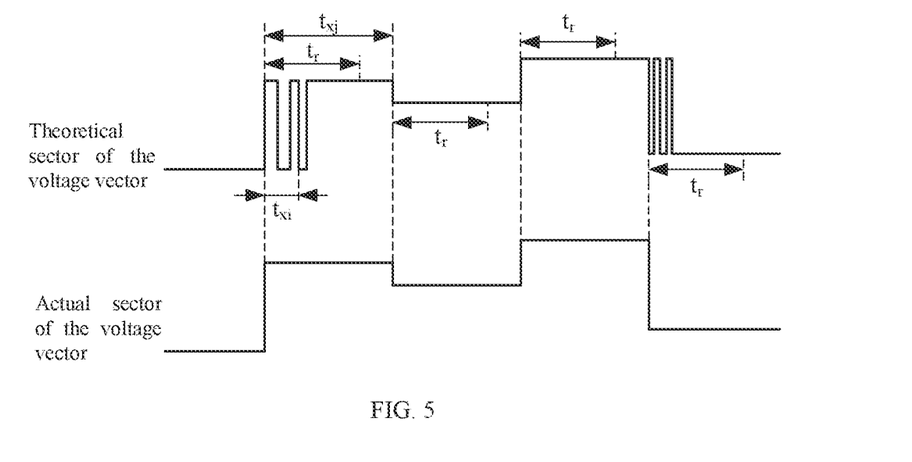
FIG. 5 shows a schematic view of the update of a sector on which the voltage sector acts in a control method for an electric motor according to an embodiment of the present disclosure.

FIG. 5 shows a schematic view of the update of a sector on which the voltage vector acts in a control method for an electric motor according to an embodiment of the present disclosure. As shown in FIG. 5, the update steps of the action sector of the voltage vector are as follows:

if the theoretical sector of the voltage vector in the $i^{th}$ control cycle is 1, the action sector of the voltage vector in the $i-1^{th}$ control cycle is 5 (it indicates that the sector changes at the moment), and the interval duration $t_{xi}$ is less than the time threshold $t_r$, then the action sector of the voltage vector in the current control cycle remains unchanged (the action sector is 5).

If the theoretical sector of the voltage vector in the $j^{th}$ control cycle is 4, the action sector of the voltage vector in the $j-1^{th}$ control cycle is 5 (it indicates that the sector changes at the moment), and the interval duration $t_{xi}$ is greater than the time threshold $t_r$, then the action sector of the voltage vector in the current control cycle is updated to be the theoretical sector of the current voltage vector (the action sector is updated to be 4).

Figure 6:
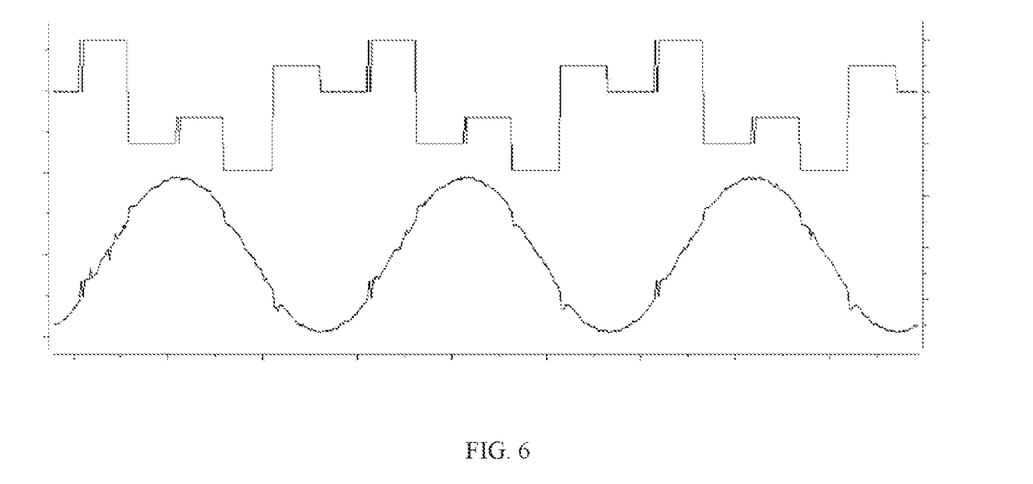
FIG. 6 shows a sector where a voltage sector is located and a phase current waveform in the prior art.
Figure 7:
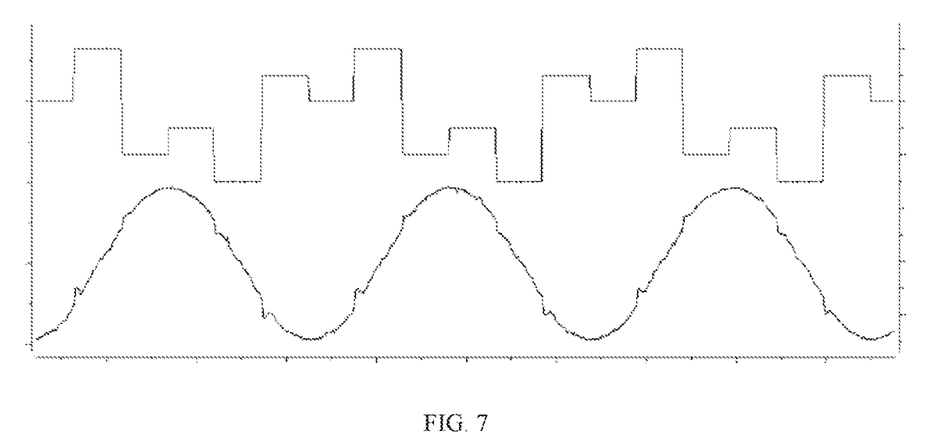
FIG. 7 shows a sector where a voltage sector is located and a phase current waveform in a control method for an electric motor according to an embodiment of the present disclosure.

FIG. 6 shows a sector where a voltage sector is located and a phase current waveform in the prior art; and FIG. 7 shows a sector where a voltage sector is located and a phase current waveform in a control method for an electric motor according to an embodiment of the present disclosure; as shown in FIG. 6 and FIG. 7, when the sector where the voltage vector is located is switched in the prior art, the phase current waveform has serious distortion, which renders the increasing of the phase current harmonics and the increasing of the operation noise of the electric motor. The embodiments according to the present disclosure can suppress the phase current distortion during the switching of the sectors of the voltage vector, reduce current harmonics, and thus lower the operation noise of the electric motor.

Figure 8:
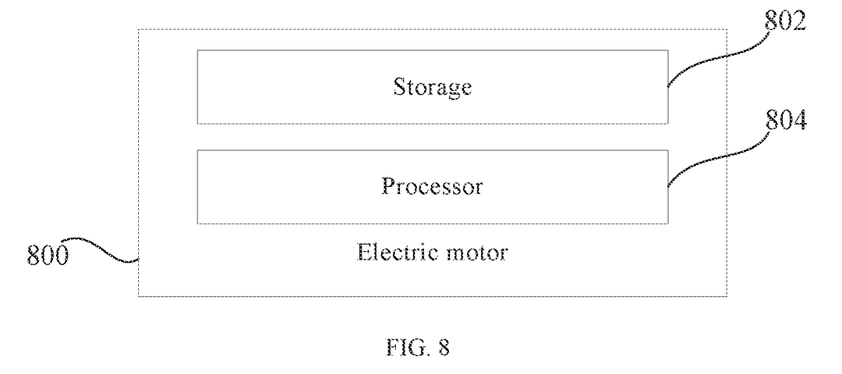
FIG. 8 shows a structural block diagram of an electric motor according to an embodiment of the present disclosure.

In some embodiments of the present disclosure, an electric motor is provided; FIG. 8 shows a structural block diagram of an electric motor according to an embodiment of the present disclosure; as shown in FIG. 8, an electric motor 800 comprises: a storage 802 storing a program or instructions; a processor 804, configured to execute the program or instructions to implement the steps of the control method according to any of the above embodiments, and therefore, the electric motor further comprises all the beneficial effects of the control method for an electric motor according to any of the above embodiments.

In an embodiment, the control process of the electric motor comprises a plurality of control cycles, when entering each control cycle, the control system of the electric motor determines, in the current control cycle, the first theoretical section of the voltage vector of the electric motor, and in an embodiment, the first theoretical section can be calculated through an SVPWM (Space Vector Pulse Width Modulation) algorithm.

Meanwhile, the control system of the electric motor acquires, in the previous control cycle, the actual sector of the voltage vector, i.e., the first sector. The control cycle mentioned in the phase of "the previous control cycle of the current control cycle" indicates a historical control cycle adjacent to the current control cycle, that is, the control process of the electric motor is to transit from "the previous control cycle" to "the current control cycle".

Furthermore, one target control cycle is determined in the plurality of historical control cycles, and the plurality of historical control cycles indicate an aggregation of all the control cycles that have passed after the electric motor starts while before it enters the current control cycle. The target control cycle is a control cycle in the plurality of historical control cycles which meets a preset condition, and an interval duration between the target control cycle and the current control cycle is acquired.

The target sector corresponding to the voltage vector of the current control cycle is determined based on the first theoretical sector of the current control cycle, the first sector of the previous control cycle, and the interval duration between the target control cycle and the current control cycle, i.e., whether the current cycle needs to switch the sector is determined, and which sector should be switched to is determined if the sector needs to be switched. Substantially the target sector is finally configured to generate the sector used by a control signal for driving the current electric motor to operate.

In the case that the sector needs to be switched based on the determination of whether the current control cycle needs to switch the sector and in the case, after the sector is switched to the target sector, the control system of the electric motor generates a corresponding driving signal based on the target sector and drives the electric motor to operate by the driving signal.

The first sector is the action sector of the voltage vector, the first theoretical sector is a sector on which the voltage vector "theoretically" may act acquired based on an algorithm; when the target sector is the same as the first theoretical sector, the first theoretical sector becomes the action sector of the voltage vector, and in an embodiment, it refers to the sector finally configured to adjust the switching time of an inverter power device. The theoretical sector and the action sector of the voltage vector can be the same or different from each other; when the theoretical vector (the located sector) of the voltage vector is configured to adjust the switching time of the inverter power device, the theoretical sector and the action sector of the voltage vector are the same; when the theoretical sector (the located sector) of the voltage vector is not configured to adjust the switching time of the inverter power device, the theoretical sector and the action sector of the voltage vector are different from each other.

The embodiment of the present disclosure determines the target sector of the current control cycle in combination with and by reference to the theoretical sector of the current control cycle, the actual sector of the previous control cycle and the interval duration between a historical control cycle and the current control cycle, and thus generates the driving signal of the electric motor based on the target sector, and this can suppress the phase current distortion of single resistance sampling during the switching of the sectors of the voltage vector, reduce current harmonics, and effectively lower the operation noise of the electric motor, and to improve user experience.

Some embodiments of the present disclosure propose a household appliance, the household appliance comprises an electric motor, the electric motor comprises a storage and a processor, a program or instructions are stored in the storage, the processor is configured to execute the program and the instructions, which is the same as the control method for an electric motor according to the above embodiments, and therefore, the household appliance further comprises all the beneficial effects of the control method for an electric motor according to any of the above embodiments, which are not described herein to avoid repetition.

The household appliance can comprise an air conditioner, an electric fan, a range hood, a gas water heater, an electric refrigerator, a laundry machine, a dryer or a blower.

The third aspect of the present disclosure proposes a computer-readable storage medium storing a program or instructions; the steps of the control method for an electric motor according to any of the above embodiments are implemented when the program or the instructions are executed by the processor; therefore, the computer-readable storage medium further comprises all the beneficial effects of the control method for an electric motor according to any of the above embodiments, which are not described herein to avoid repetition.

In the specification of the present disclosure, the term of "a plurality of" refers to two or more, unless otherwise clearly defined. The orientation or position relations indicated by the terms of "upper", "lower", and the like are based on the orientation or position relations shown in the accompanying drawings, and they are just intended to conveniently describe the present disclosure and simplify the description, and are not intended to indicate or imply that the devices or units as indicated should have specific orientations or should be configured or operated in specific orientations, and then should not be construed as limitations to the present disclosure. The terms of "connected with", "mounting", "fix" and the like should be understood in a broad sense, in an embodiment, the term "connected with" can be a fixed connection, a detachable connection, or an integral connection; it can be a direct connection or an indirect connection through an intermediate medium. For a person skilled in the art, they may understand the specific meanings of the above-mentioned terms in the present disclosure based on specific circumstances.

In the specification of the present disclosure, the description of the terms of "an embodiment", "some embodiments", "specific embodiment" and the like is intended to mean that the specific features, structures, materials or characteristics described in combination with the embodiments or examples are included in at least one embodiment or example of the present disclosure. In the specification, the illustrative expression of the above terms may not indicate the same embodiment or example. In addition, the specific features, structures, materials or characteristics described above may be combined with each other in an appropriate method in one or more of any embodiments or examples.

The above-mentioned are merely some embodiments of the present disclosure and not intended to limit the present disclosure, and for one skilled in the art, various modifications and changes may be made to the present disclosure. Any modifications, equivalent substitutions, improvements and so on made within the spirit and principle of the present disclosure should be covered within the scope of protection of the present disclosure.

What is claimed is:

1. A control method for an electric motor, the control method comprising:
    determining, in a current control cycle, a first theoretical sector corresponding to the voltage vector of the electric motor;
    obtaining, in the previous control cycle of the current control cycle, a first sector corresponding to the voltage vector;
    determining a target control cycle in a plurality of historical control cycles which precede the current control cycle, and determining an interval duration between the target control cycle and the current control cycle;
    determining a target sector corresponding to the voltage vector in the current control cycle based on the first theoretical sector, the first sector and the interval duration; and
    generating a corresponding driving signal based on the target sector, and driving the electric motor to operate through the driving signal.

2. The control method according to claim 1, wherein the determining, in the current control cycle, the first theoretical sector corresponding to the voltage vector of an electric motor comprises:
    calculating the first theoretical sector according to a voltage instruction in the current control cycle using space vector pulse width modulation.

3. The control method according to claim 1, further comprising:
    starting timing at the beginning of the first control cycle;
    determining, after entering each control cycle, whether a second theoretical sector corresponding to the voltage vector is the same as a second sector corresponding to the voltage vector in the previous control cycle; and
    obtaining a timing duration and restarting timing responsive to that the second theoretical sector is different from the second sector and the duration corresponding to the second sector is greater than or equal to a duration threshold.

4. The control method according to claim 3, wherein the target control cycle satisfies the following conditions:
    the third sectors corresponding to all the historical control cycles between the target control cycle and the current control cycle are all the first sector.

5. The control method according to claim 4, wherein the determining the interval duration between the target control cycle and the current control cycle comprises:

determining the interval duration based on the timing duration.

6. The control method according to claim 5, wherein the determining the target sector corresponding to the voltage vector in the current control cycle based on the first theoretical sector, the first sector and the interval duration comprises:
   determining that the target sector is the first sector responsive to that the first theoretical sector is the same as the first sector, or responsive to that the first theoretical sector is different from the first sector and the interval duration is less than the duration threshold; and
   determining that the target sector is the first theoretical sector responsive to that the first theoretical sector is different from the first sector and the interval duration is greater than or equal to the duration threshold.

7. The control method according to claim 5, wherein the duration threshold is a product of the duration of the second sector and a preset constant, wherein the preset constant ranges from 0.1 to 1.

8. The control method according to claim 5, wherein the duration threshold is determined based on the current rotational speed of the electric motor or the maximum rotational speed of the electric motor, wherein the duration threshold is negatively correlated with the current rotational speed or the maximum rotational speed.

9. The control method according to claim 4, wherein the determining the target sector corresponding to the voltage vector in the current control cycle based on the first theoretical sector, the first sector and the interval duration comprises:
   determining that the target sector is the first sector responsive to that the first theoretical sector is the same as the first sector, or responsive to that the first theoretical sector is different from the first sector and the interval duration is less than the duration threshold; and
   determining that the target sector is the first theoretical sector responsive to that the first theoretical sector is different from the first sector and the interval duration is greater than or equal to the duration threshold.

10. The control method according to claim 4, wherein the duration threshold is a product of the duration of the second sector and a preset constant, wherein the preset constant ranges from 0.1 to 1.

11. The control method according to claim 4, wherein the duration threshold is determined based on the current rotational speed of the electric motor or the maximum rotational speed of the electric motor, wherein the duration threshold is negatively correlated with the current rotational speed or the maximum rotational speed.

12. The control method according to claim 3, wherein the determining the target sector corresponding to the voltage vector in the current control cycle based on the first theoretical sector, the first sector and the interval duration comprises:
   determining that the target sector is the first sector responsive to that the first theoretical sector is the same as the first sector, or responsive to that the first theoretical sector is different from the first sector and the interval duration is less than the duration threshold; and
   determining that the target sector is the first theoretical sector responsive to that the first theoretical sector is different from the first sector and the interval duration is greater than or equal to the duration threshold.

13. The control method according to claim 3, wherein the duration threshold is a product of the duration of the second sector and a preset constant, wherein the preset constant ranges from 0.1 to 1.

14. The control method according to claim 3, wherein the duration threshold is determined based on the current rotational speed of the electric motor or the maximum rotational speed of the electric motor, wherein the duration threshold is negatively correlated with the current rotational speed or the maximum rotational speed.

15. An electric motor comprising:
   a storage storing a program or instructions; and
   a processor configured to execute the program or instructions to implement the control method according to claim 1.

16. A computer-readable storage medium storing a program or instructions, wherein the program or instructions, when executed by a processor, implement the control method for the electric motor according to claim 1.

\* \* \* \* \*